United States Patent [19]

Andrae

[11] Patent Number: 4,611,972
[45] Date of Patent: Sep. 16, 1986

[54] AEROPLANE PROPELLER

[76] Inventor: Ralph Andrae, 15 Morgan St., Crystal Lake, Ill. 60014

[21] Appl. No.: 615,566

[22] Filed: May 31, 1984

[51] Int. Cl.$^4$ .......................................... B64C 11/06
[52] U.S. Cl. ................... 416/214 R; 416/208; 416/204 R; 403/14; 403/312; 403/404; 411/908
[58] Field of Search .................... 416/208, 207, 244 B, 416/214 R, 214 A, 241 A, 224, 230 R, 230 A, 248, 205, 204 R; 403/13, 14, 312, 174, 178, 404; 411/908, 901

[56] References Cited

U.S. PATENT DOCUMENTS

| | | | |
|---|---|---|---|
| 1,902,096 | 3/1933 | Pearson | 416/207 |
| 2,127,264 | 8/1938 | Lampton | 416/248 |
| 2,278,900 | 4/1942 | Sensenich | 416/214 R |
| 2,279,633 | 4/1942 | Merickle | 416/208 |
| 2,415,033 | 1/1947 | Nygren | 416/214 R |
| 2,563,020 | 8/1951 | Gemeinhardt | 416/208 |
| 3,130,677 | 4/1964 | Liebhart | 416/207 |
| 3,161,239 | 12/1964 | Andersen | 416/208 |
| 3,388,749 | 6/1968 | Woods et al. | 416/229 R |
| 3,424,434 | 1/1969 | Palfreyman et al. | 416/214 R |
| 4,035,093 | 7/1977 | Redshaw | 416/207 |
| 4,053,259 | 10/1977 | Bianchi | 416/208 |
| 4,156,583 | 5/1979 | Mayerjak | 416/208 |
| 4,362,449 | 12/1982 | Hlinsky | 416/214 A |

FOREIGN PATENT DOCUMENTS

| | | | |
|---|---|---|---|
| 0245187 | 12/1925 | United Kingdom | 416/214 R |
| 0446964 | 5/1936 | United Kingdom | 416/207 |
| 0243136 | 9/1969 | U.S.S.R. | 416/214 |

Primary Examiner—Robert E. Garrett
Assistant Examiner—H. Edward Li
Attorney, Agent, or Firm—John J. Kowalik

[57] ABSTRACT

An aeroplane propeller assembly comprising a pair of hub members made of nylon with glass fibers interspersed therein forming an undulant gripping surface for clamping the root ends of wooden propeller blades and embedding the raised areas of the hub surfaces into the wood to obtain a firm and shakeproof purchase thereon as the hub members are bolted to each other and to the blades. The hub members are in the form of discs and have root-end-confining pockets formed to clamp the end portions and hold them under compression tightly within the pockets, each pocket having sharp pins molded therein and strategically located not only to pierce into the wood but also to swell the wood and contour it against the enclosing surfaces of the pocket. The propeller blade root ends are adapted to be cut at different angles to obtain different pitch upon being fitted into the same pockets.

6 Claims, 6 Drawing Figures

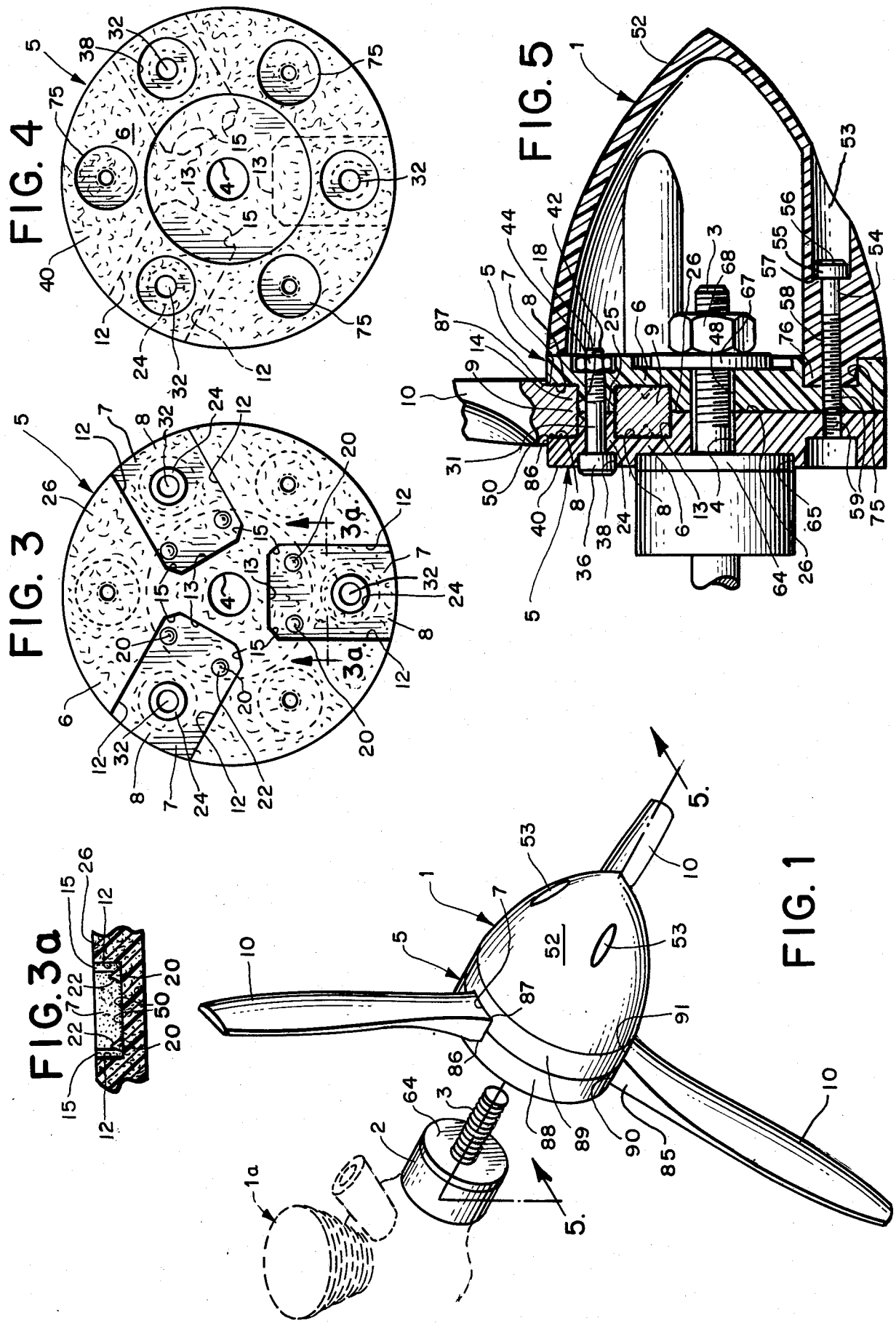

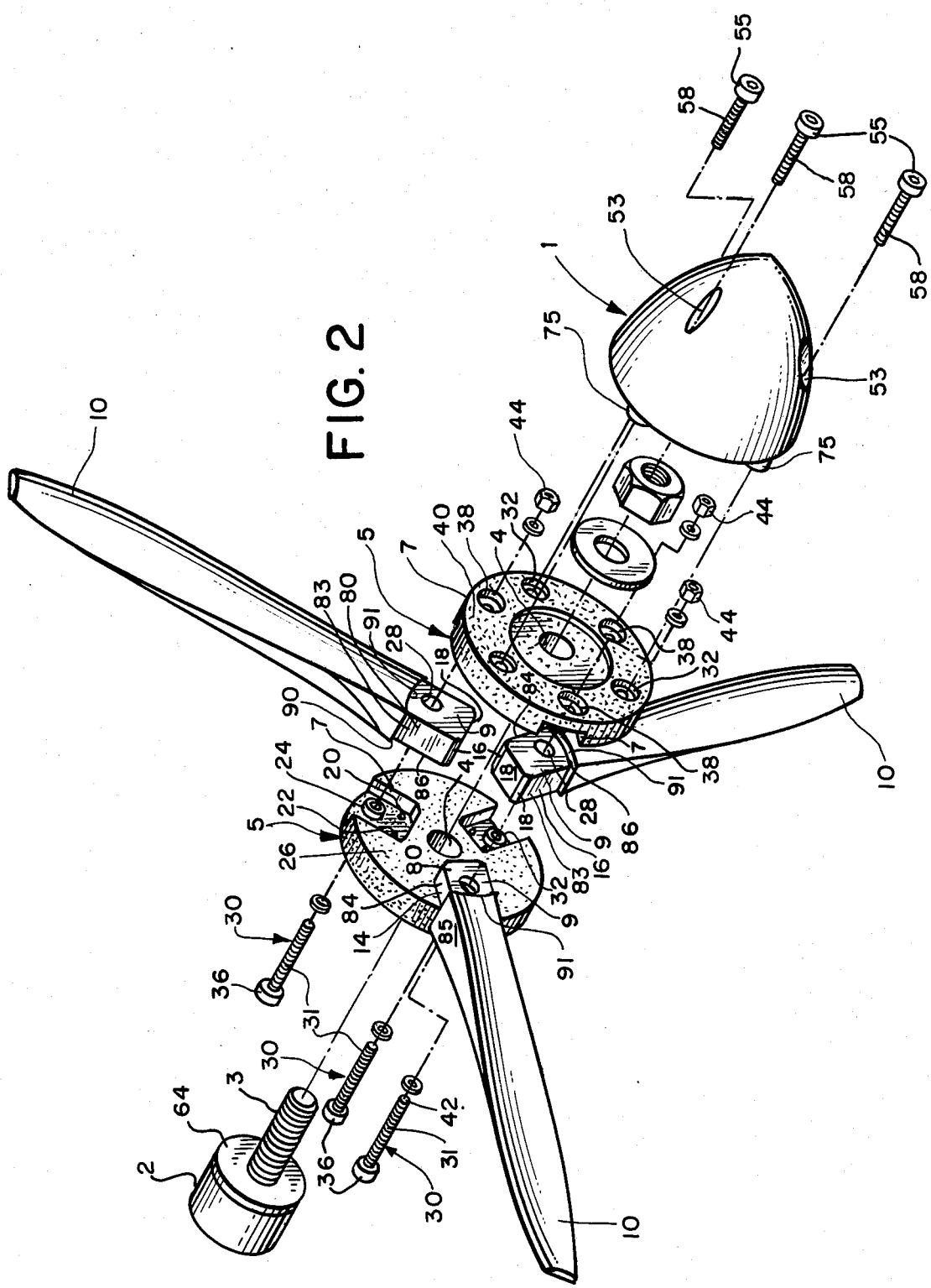

AEROPLANE PROPELLER

BACKGROUND OF THE INVENTION

Propellers for model aircraft are usually difficult to maintain and to prevent their being broken. Such aircraft, because it is invariably radio controlled, frequently have minor landing accidents and unfortunately, it is generally the proprreller that is damaged. Thus two-bladed wood propellers are normally used, since they are relatively inexpensive, of light weight, strong, and have good shock absorbing characteristics upon impact. Two-bladed propellers, however, are very noisy and not as efficients as the three-bladed kind, which are much more expensive and are more quiet.

SUMMARY OF THE INVENTION

This invention pertains to a novel three-blade propeller assembly.

A specific object of the invention is to provide a novel hub and individual wooden blades which are easily and effectively attachable to the hub in a novel manner so they do not shake loose due to engine vibration and their high spinning rate.

A further object is to provide a novel hub which is made up of a pair of fiber impregnated nylon disks which are bolted together about the root ends of the blades, the fibers developing undulant and tentacled surfaces which are impressed into and indent the wood material of the blades to obtain a firm purchase thereon, and the random distribution of the fiber glass strands not only improving the strength of the hub disks but also providing nonlinear compression loads on the root ends of the blades.

The invention also contemplates threading of the bolts into the nylon matrix, where feasible, to prevent the bolts from loosening.

The invention comprehends providing hub elements of high duramater so that they are stiff and retain their shapes under various assembly and operating loads.

The invention provides, in addition to the fiber-wood interlock between the root end of each blade and the hub components, opposing notches or pockets in the facing sides of the blade-clamping components or halves of the hub, each notch having a depth to complementally accommodate slightly less than half of the thickness of the root portion of the associated blade and having a pair of sharp pointed pins moulded within each notch on the back wall portion thereof, these pins being of conical shape and being circumferentially spaced and being adapted to compressively indent the opposing root portion of the associated blade to provide a positive mechanical interlock therewith and to fit the blade end tightly within the notch so that the blade, which is confined also on its lateral sides and inner end as well as on its circumferential side cannot shake loose from the hub. Each blade also has a cylindrical opening through its root end which receives through its opposite ends close fitting cylindrical sleeves formed integral with the opposing hub portions. The hub portions or halves are secured to each other and are tightly clamped against the root ends of the blades by nut and bolt assemblies passing through the sleeves, the head of each bolt engaging the external side of one hub portion and a nut being threaded on the opposite end of each bolt and bearing against the external side of the other half of the hub.

These and other objects and advantages inherent in and encompased by the invention will become more apparent from the specification and the drawing wherein:

FIG. 1 is a perspective view of the novel propeller assembly shown in an exploded view with part of the aircraft engine illustrated in phantom lines;

FIG. 2 is an exploded view in perspective of the novel propeller assembly;

FIG. 3 is a side elevational view of the inner side of one of the complementary halves of the hub;

FIG. 3A is a cross-sectional view taken substantially on line 3—3 of FIG. 3;

FIG. 4 is an external side elevational view of the hub half shown in FIG. 3; and FIG. 5 is an assembled axial cross-sectional view taken substantially on line 5—5 of FIG. 1.

DESCRIPTION OF THE INVENTION

The propeller assembly generally designated 1 in the drawings is shown in association with a typical aircraft engine (in phantom lines) which has a power output shaft comprising a coupling block 2 with a forwardly projecting shank 3 as well known in the model aircraft art.

The shank 3 extends through center openings 4,4 in a pair of oppositely positioned front and rear substantially identical hub discs 5,5 each of which is made of plastic such as nylon mixed with fiber glass. The fiber glass provides a roughed texture to the exterior surfaces of the discs. Each disc has a relatively thick body section 6. Each disc has three equally circumferentially spaced slots or pockets 7 formed in the inner side of the body section, and each slot is defined by a flat inner radial face 8 equal to the width of the root end portion 9 of an associated wooden propeller blade 10. Each slot has a pair of lateral or side edge walls 12,12 and an inner edge wall 13. The walls or shoulders 12 and 13 extend widthwise axially of the hub and have a width slightly less, that is only a few millimeters, than half the thickness of the side edges of the root portion of the associated blade which is fitted therein.

In other words the side edges of the roots end portion designated 83,84 are slightly greater in width initially than the combined widths of the opposing side walls of the pockets.

The corners between the walls 12 and 13 are formed with diagonal fillets 15,15 which complement the diagonal edges 16,16 formed on the root ends of the blades. The blade widths are such that they fit complementally into each respective pocket and the inner edge 18 of the blade fits complementally against the wall 13.

There are formed in each pocket on the circumferential face 8 thereof a pair of locking or piercing pins 20,20 of conical shape each having a sharp point 22. The depth of each pin is about half of the axial depth of the pocket and the pins in each pocket are spaced circumferentially and positioned slightly above each fillet 15 and inwardly of the lateral wall 12.

Each pocket has a spacer sleeve 24 formed substantially centrally therein which has an outer edge 25 coplanar with the inner side face 26 of the body portion of the respective disc.

The root end portion of each blade has an opening 28 therein through which the related spacer sleeve 24 is tightly fitted.

FIG. 5 shows the assembly of the root ends of the blades with the opposing hub halves which are clamped against the opposite sides of the root ends. Opposing spacer sleeves 24,24 are entered into each opening 28 of the blade root end portion and the opposite sides of the root end portions are entered into the opposing pockets.

A bolt 30 has its shank 31 extened through the openings 32 in the sleeves 24 and the disk bodies 6. The head 36 at one end of the bolt 30 is recessed into a cavity 38 in the disc body 6 but projects about 1/16" (one sixteenth of an inch) beyond the external side of the body. The opposite end 42 of the threaded end of the shank is fitted with a washer sleeved thereon behind a nut 44 which is threaded on the shank and fits into recess 38 in the front disc. The nuts 44 upon being tightened cause the two opposing disc halves to be drawn together until the edges 25 of the spacer sleeves abut each other and the inner sides or inner faces 26 of the discs are butted together as seen in FIG. 5. Attendant to the discs being drawn together the pins pierce the wooden root ends of the blades and expand the adjacent portions thereof against the contiguous side walls to obtain a tight compression fit. Also since the root ends are slightly thicker than the root-accommodating space in the assembled position of the discs, the root ends are squeezed and compressed to fit into the pockets tightly and imbedded into the fiberous humps or projections formed by the glass fibers entrained within the matrix of the body portions of the discs. Since these fibers are randomly distributed and provide relatively smooth contours, their impressions into the wood do not develop any high stress cracks but undulant depressions therein and thus augment the gripping purchase on the root ends of the blades which will not shake loose during operation. The propeller assembly is provided with a nose cone 52 which has three axial recesses therein each of which leads to an aperture 54. The nose cone 52 is fastened to the hub by bolts 55 each of which has a head seated against a shoulder 57 at the inner end of recess 54. The shank of each bolt 55 passes through the respective aperture 54 and is threaded into aligned openings 59,59 in the discs and thus secures the nose to the hub.

The hub is secured to the power output shaft 2 of the engine 1a. The cylindrical mounting or coupling block 2 has its front end portion 64 snugly fitted within a complementary socket 65 in the outer face of the rear disc of the hub. The forward end of the shank portion of the shaft 2 mounts a washer 67 forwardly of the front disc and a nut 68 which is threaded thereon in front of the washer. The nut 68 upon tightening draws the block 2 tightly into the socket 65 and the front and rear discs against each other and tightly against the root ends of the blades compressing the same.

It will be noted that the front and rear discs have three equally circumferentially spaced cylindrical opening 75 therein on their external sides and that these openings in the front disc receive three similarly spaced integral sleeves 76 on the base of the spinner or nose which is positioned concentric with the hub. Thus torque is transferred directly through the sleeves of the plastic spinner and the hub.

As best seen in FIGS. 2 and 5 the root end portions of the blades are of rectangular section having parallel front and rear faces 80,82 and parallel sides 83,84 which are perpendicular to the front and rear faces 80,82 and that the corners 16,16 are chamfered to complementally fit against the diagonal fillets in the pockets. The pitch of the propeller blade is determined by the angle at which the front and rear faces 80,82 of the root ends are cut to the plane of the blade. To increase the pitch the angle is increased and to lessen the pitch the angle is decreased. Thus if the user requires different pitched blades he merely replaces one set for another.

It will be seen that as the root end is differently angled the thick transistion section 85 between the root end and the inner end of the blade has portions 86,87 of different dimensions which overlap the cylindrical or annular peripheries 88,89 of the front and rear discs and have arcuate faces 90, 91 complementally seated thereagainst.

A novel propeller assembly has been disclosed in the preferred embodiment. However, other forms will now become readily apparent from the foregoing disclosure which are intended to be covered by the appended claims.

I claim:

1. A propeller assembly comprising a pair of complementary front and rear hub members having opposing pockets with rough textured grasping surfaces therein,
   propeller blades made of wood material having root end portions with initially plain faces fitted into said pockets,
   means securing said hub members to each other and to said blades at said root end portions in compressing relation thereto,
   said hub members being made of plastic material with multidirectionally oriented non-plastic fibers interspersed therein bulged outwardly from said grasping surfaces, and
   said fibers being impressed into and indenting the plain faces of the wood material at the root end portions for obtaining a firm purchase thereon attendant to said hub members being clamped about said root end portions.

2. The invention according to claim 1 and said root end portions in preassembly being non-pierced and said pockets having side edges embracing the root end portions and having points projecting from said grasping surfaces and being located adjacent to said side edges and penetrating the respective root end portions adjacent to their distal ends and distorting and swelling the same laterally into tight engagement with respective side edges.

3. The invention according to claim 1 and said plastic material being nylon and said fibers being fiber glass.

4. A hub member of a pair for use in a model aircraft propeller assembly comprising an annular rigid plastic disc having a cylindrical periphery and having a relatively flat outer side and an inner side with a plurality of axially indented pockets therein, each pocket having an axially open side and an open peripheral end for complementally admitting a root end portion of an associated wooden propeller blade therein,
   means within the pocket for piercing the root end portion of such propeller blade and distorting it to fit tightly within the pocket,
   a plurality of randomly disposed fiber particles dispersed within said disc and projecting into said pockets and extending in different directions and raised above the plane of the sides of said pockets for indenting the root end portions of the respective blades mounted therein and penetrating the same in criss-crossing patterns upon said hub members clampingly engaging the root end portion to firmly hold the same from shaking loose during operation.

5. The invention according to claim 4 and said hub member being a composite of nylon and glass fiber and said glass fiber protruding to the external surface of the member and defining an undulant grasping surface for engaging the blade root end.

6. A model aircraft propeller assembly having wooden blades each of which has a flat face root end portion adaptable to be shaped to provide a blade with a selected pitch, a pair of rigid front and rear hub members disposed in clamping relation to said root end portions and having opposing pockets with rough textured grasping surfaces therein, means on said hub members adapted to pierce and distort the root end portions and impose a compressive load thereon, said hub members being made of plastic material with multidirectionally oriented fibers interspersed therein bulged outwardly from said grasping surfaces, and said hub members being clampingly engaged with said root end portions under sufficient pressure to imbed the fibers in criss-crossing patterns into the root end portions to obtain a firm shakeproof hold thereon.

* * * * *